(12) United States Patent
Stocchi

(10) Patent No.: US 10,308,443 B2
(45) Date of Patent: Jun. 4, 2019

(54) APPARATUS FOR THE MOVEMENT OF CONTAINERS

(71) Applicant: AVE TECHNOLOGIES S.R.L., Spinea (VE) (IT)

(72) Inventor: Gabriele Stocchi, Spinea (IT)

(73) Assignee: AVE TECHNOLOGIES S.R.L., Spinea (VE) (IT)

( * ) Notice: Subject to any disclaimer, the term of this patent is extended or adjusted under 35 U.S.C. 154(b) by 0 days.

(21) Appl. No.: 15/748,954

(22) PCT Filed: Jul. 29, 2016

(86) PCT No.: PCT/IB2016/054561
§ 371 (c)(1),
(2) Date: Jan. 30, 2018

(87) PCT Pub. No.: WO2017/021848
PCT Pub. Date: Feb. 9, 2017

(65) Prior Publication Data
US 2019/0002211 A1    Jan. 3, 2019

(30) Foreign Application Priority Data
Jul. 31, 2015  (IT) .................... 102015000040874

(51) Int. Cl.
*B65G 47/84* (2006.01)
*B65G 47/86* (2006.01)

(52) U.S. Cl.
CPC ........... *B65G 47/847* (2013.01); *B65G 47/84* (2013.01); *B65G 2201/0244* (2013.01)

(58) Field of Classification Search
CPC ....... B65G 47/846; B65G 47/84; B65G 29/00
(Continued)

(56) References Cited

U.S. PATENT DOCUMENTS 1,503,521 A * 8/1924 Strandt ................. B67C 3/22
                                                    198/459.2
2,155,088 A * 4/1939 Hopkins ............... B65B 43/50
                                                    198/459.8
(Continued)

FOREIGN PATENT DOCUMENTS

DE    28 06 058 A1    8/1979
EP    2 186 759 A1    5/2010
(Continued)

OTHER PUBLICATIONS

International Search Report, dated Oct. 27, 2016, from corresponding PCT application No. PCT/IB2016/054561.

*Primary Examiner* — James R Bidwell
(74) *Attorney, Agent, or Firm* — Young & Thompson

(57) ABSTRACT

An apparatus for the movement of bottles in bottling plants includes a frame and a star-shaped structure adapted to rotate on a vertical axis through first moving unit and including at least a side edge, the side edge being adapted to abut on a bottle so as to move it, wherein a scoop is pivoted and placed adjacent on the at least a portion of end of the side edge and adapted to abut on the bottle, so that the side face and the side edge create a continuous supporting profile for the first bottle, the scoop being coupled to a moving mechanism adapted to make the scoop rotate, so as to vary the angle between the side face and the side edge; wherein the moving mechanism includes a cam guide fixed to the frame, a first and second levers coupled to the scoop.

20 Claims, 3 Drawing Sheets

(58) Field of Classification Search
USPC .............................. 198/478.1, 480.1, 481.1
See application file for complete search history.

(56) References Cited

U.S. PATENT DOCUMENTS

| | | | | |
|---|---|---|---|---|
| 2,649,183 | A | * | 8/1953 | Steck ...................... B65B 35/26 198/480.1 |
| 7,543,697 | B2 | * | 6/2009 | Legallais ............. B65G 47/847 198/470.1 |
| 8,413,799 | B2 | * | 4/2013 | Bodtlander ............ B65G 29/00 198/470.1 |
| 2017/0121126 | A1 | * | 5/2017 | Garcia ................. B65G 47/846 |

FOREIGN PATENT DOCUMENTS

| JP | H10-338342 A | 12/1998 |
|---|---|---|
| JP | H11-171332 A | 6/1999 |
| JP | 2015-125017 A | 7/2015 |

* cited by examiner

APPARATUS FOR THE MOVEMENT OF CONTAINERS

BACKGROUND OF THE INVENTION

Field of the Invention

The present invention refers to an apparatus for the movement of containers. More particularly, the present invention refers to an apparatus for moving containers, in particular bottles, in bottling plants.

Description of the Related Art

As is known, moving means are used in bottling plants in order to move bottles or other containers among the different operating machines used for the rinsing, filling, plugging and labelling.

These moving means are configured as rotating carousels to which ends handling means, for example pliers, are fixed, suitable for grabbing one bottle at a time in order to make it turn around the carousel itself.

In order to work bottles with different shape and size, it is necessary to perform some adjustment to said handling means, set up which obliges to stop the whole plant with resulting efficiency lost.

The adjustment of the handling means has to permit not only a tight grab of the bottles with different shape and size, but it has to realize also a perfect centering of the bottles themselves with the heads of the different operating machines used in the plant.

Apparatus, as the one disclosed in the European Patent EP 2186759, have been introduced in order to overcome the above mentioned problems; said apparatus are architecturally complex and thus easily subject to broken or malfunctioning.

SUMMARY OF THE INVENTION

The aim of the invention is to overcome the problems mentioned above and others, by providing an apparatus for the movement of containers, in particular bottles, apparatus which permits to move containers with different shape and size.

Another aim of the invention is to provide an apparatus for the movement of containers wherein, even on varying the shape and the size of the containers to be moved, the apparatus maintains the containers themselves aligned with the heads of the operating machines present in the bottling plant.

A further aim of the invention is to provide an apparatus for the movement of containers, in particular bottles, apparatus which is architecturally simple, even if guaranteeing a immediate set up on varying the shape and the size of the containers to be moved.

These aims and benefits are all met, according to the invention, by an apparatus for the movement of bottles in bottling plants, comprising a frame and a star-shaped structure adapted to rotate on a vertical axis relative to the frame through first moving means and comprising at least a portion of end with a side edge which is adapted to abut on a first bottle so as to move said bottle.

In particular, a scoop is pivoted on the at least a portion of end of the rotating star-shaped structure and has a side face adapted to abut on the first bottle.

Said scoop is coupled to a moving mechanism adapted to open wide said scoop from one or more ends in relation to a given angle of the rotation performed by the rotating structure.

Thanks to this configuration and to the presence of the moving mechanism, the scoop, along with the respective end, defines a sort of "V" in which the container is fixed, so as to move it during the rotation of the rotating structure.

When the given angle is reached, the scoop itself, when it is open wide from the respective end, leaves the first bottle free to move and wiggle out, so that said first bottle can be handled by other moving system.

Advantageously, the apparatus according to the invention can provide that the moving mechanism comprises a guide fixed to the frame, and a first lever coupled to a first end of the scoop and comprising a roller on a second end, opposite to the first end, the roller being adapted to slide on said guide.

In this way, according to the shape of the guide, the scoop moves relative to the respective end of the rotating structure to which the scoop is fastened.

In order to coordinate the movement of the scoop relative to the shape of the guide, the first end of the first lever can be fixed rigidly to the scoop.

Alternatively, the first end of the first lever can be connected rotatably to the scoop and the moving mechanism can comprise a second lever comprising a first end connected rotatably to the star-shaped structure and a second end, opposite to the first end, connected rotatably to the second end of the first lever, so as to make the movement of the scoop more fluid and wide.

Advantageously, the guide can have, in a first portion, a regular, circular development coinciding with the center of rotation of the rotating structure and, in a second portion, a curvilinear development so that the scoop has always the same position relative to the end to which it is fastened when the roller is on the first portion and that the scoop is open wide relative to the end to which it is fastened when the roller is on the second portion.

Advantageously, the guide can be rotatable relative to the frame through second moving means, so as to adjust the position in which the scoop is open wide relative to the end to which the scoop is fastened.

Besides, the rotating star-shaped structure can be rotatable relative to the frame through second moving means, so as to vary the position of the container once it is grab and to set in phase with one or more operating machines which have to perform operations on the container. Besides, said different positioning of the star-shaped structure relative to the frame is a sort of setting which permit to move bottles with different diameter.

Advantageously, the side profile of the portion of end and the side face of the scoop fixed to the same end can show together, substantially, a V-shape suitable for being self-centering of the container, so that the container is always placed, with its geometric centre, on the same circumference defined during the rotation performed thanks to the movement of the rotating structure, irrespective of the diameter of the bottle.

In particular, the side profile of the end can be curved and concave, so as to settle the container.

Similarly, the side face of the scoop as well can have a curved, concave development.

BRIEF DESCRIPTION OF THE DRAWINGS

Further features and details of the invention will be better understood from the following specification, which is provided by way of a non-limiting example, as well as from the annexed drawings, wherein.

DESCRIPTION OF THE PREFERRED EMBODIMENTS

Figure 1:
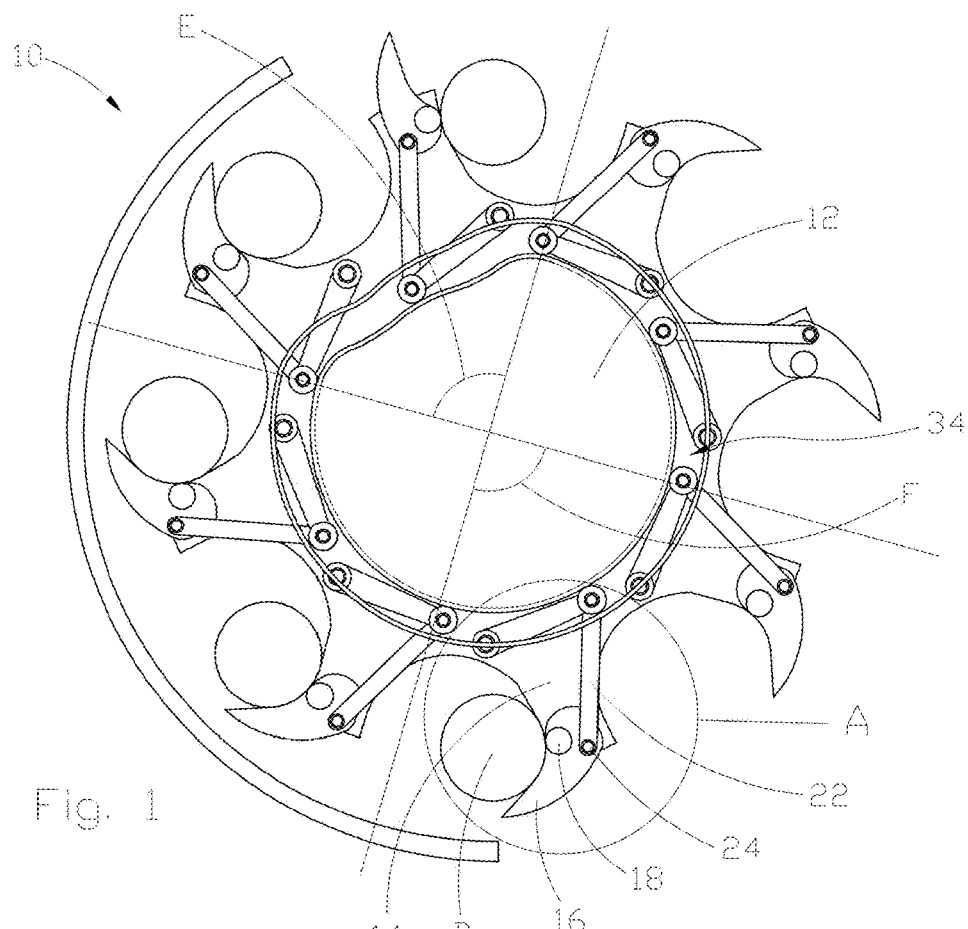
FIG. 1 is a synthetic top view of an apparatus for the movement of containers, according to the invention.
Figure 2:
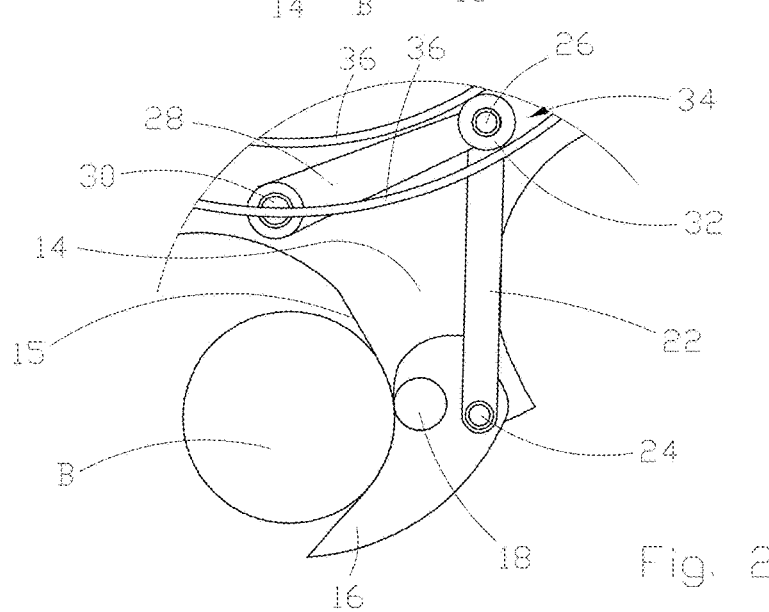
FIG. 2 is the view of a detail indicated with A in FIG. 1.
Figure 3:
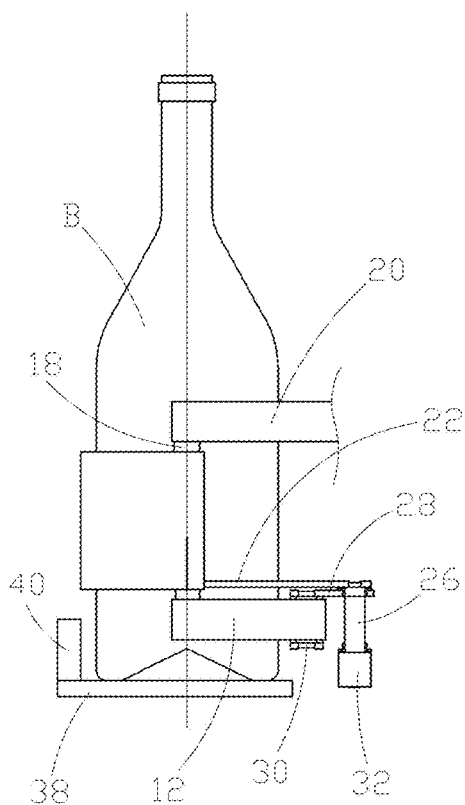
FIG. 3 is a synthetic side view of handling means of the apparatus of FIG. 1.

With reference to the figures attached, in particular to FIGS. 1, 2 and 3, an apparatus for the movement of containers is pointed with the reference number 10.

Below, it is referred to the movement of bottles B, but of course the apparatus can be used also for the movement of containers having at least a cylindrical portion, or however having a shape with a regular polygonal-shaped transverse section.

The apparatus 10 comprises a frame, not shown in the figures, relative to which a rotating star-shaped structure 12 can rotate, said rotating star-shaped structure 12 having eight protruding portions of end 14, which are regular angular spaced.

Elements suitable for guaranteeing the grabbing, the movement and the releasing of a bottle B in different zones of the apparatus 10, are directly and indirectly connected to each one of the portions of end.

In FIG. 1 only the elements corresponding to one of the eight ends are pointed with numerical references.

A respective scoop 16 is hinged to each portion of end 14 through a shaft 18, so that each scoop 16 can swing relative to the portion of end 14 to which is fastened.

Each scoop 16 has a side face having an curved profile and suitable for abut on a bottle B.

As shown in FIG. 3, each scoop 16 is also fastened through the same shaft 18 to a top supporting structure 20, integral to the rotating star-shaped structure 12.

A first lever 22 is fastened to each scoop 16 through a first pin 24, the first lever 22 being, in its turn, rotatably fastened to a second lever 28 through a second pin 26.

Besides, the end opposed to the second pin 26 of each second lever 28 is fastened to the rotating star-shaped structure 12 through a third pin 30.

A roller 32 is fixed to an end of each second pin 26, said roller 32 being free to roll on a guide 34, functioning as a cam, fixed to the frame and defined by two rails 36 parallel to each other.

Thus, the rotating star-shaped structure 12 can rotate relative to the guide 34.

In particular, the roller 32 and the guide 34 create a cam mechanism which, together with the first lever 22 and the second lever 28, move the corresponding scoop 16 according to the movement which has to be performed by the bottle B.

As shown in FIG. 1, the guide 34 has a substantially circular shape, a part from an angular sector E, in which it is flattened towards the center.

In fact, the apparatus 10 comprises different zones according to the operations to be carried out on the bottles B.

A first zone, corresponding substantially to the circular sector indicated with F, is the area in which the bottle, herein conducted by other moving means, is received and moved by a scoop 16 thanks to the side edge 15 of the portion of end 14 which the scoop 16 itself us fastened to.

The movement of the bottle B, regardless of its diameter, is guaranteed by the particular shape and by the arrangement of the scoop 16 and of the side edge 15 of the portion of end 14.

In fact, the scoop 16 and the side edge 15 create, all together, a handling means having a substantially V-shape which, having curved supporting surfaces, becomes also self-centering for the related bottle B.

A second zone, corresponding to the angular sector E, corresponds to the area wherein each bottle B has to be left free of changing trajectory according the following moving means which acts on the bottle itself.

In said zone the guide 34, as above described, change its shape with respect to the remaining portion in which it is perfectly circular.

The roller 32 forces the first lever 22 to move the scoop 16 to which the first lever is fastened, so as to make the scoop 16 itself open wide from the portion of end 14 on which the scoop 16 is hinged.

The bottle B, which is moved by the scoop and by the side edge of the portion of end till this moment, is therefore more free and it can be moved by other moving means.

Between the first zone and the second zone, following the clockwise movement of the rotating star-shaped structure 12, the bottles are moved supported by a base 38 delimited laterally by a wall 40, following a circular trajectory.

Along this semicircular path the desired operation can be performed on each bottle, according to the operating machine which has been placed, for example for the rinsing, the filling, the plugging, the labeling or others.

In fact, the bottles are moved in a stable way and, in particular, they are always placed, regardless of their shape and size, in correspondence of the working head of the operating machine placed therein.

Figure 8:
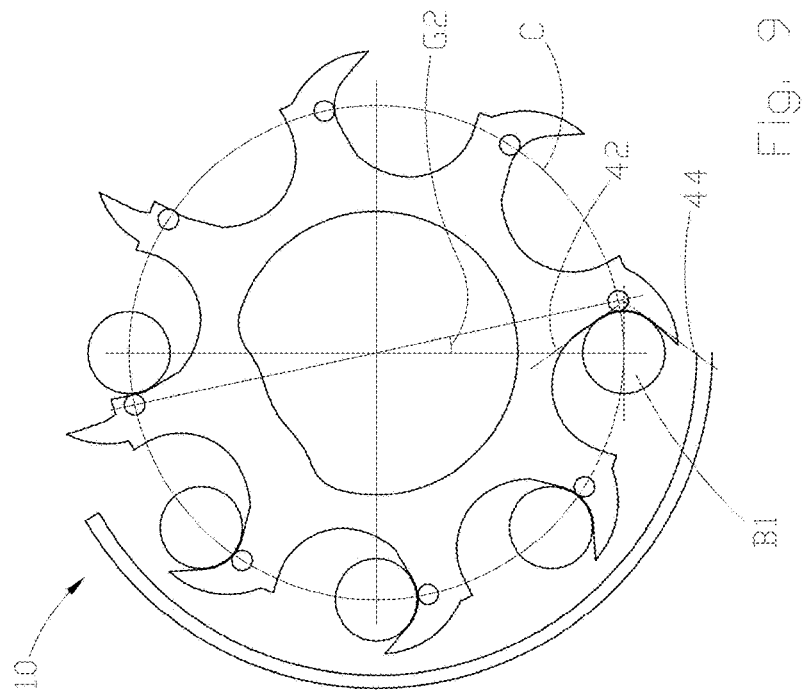
FIG. 8 is a synthetic top view of the apparatus of FIG. 1, apparatus used for moving bottles with a first diameter.
Figure 9:
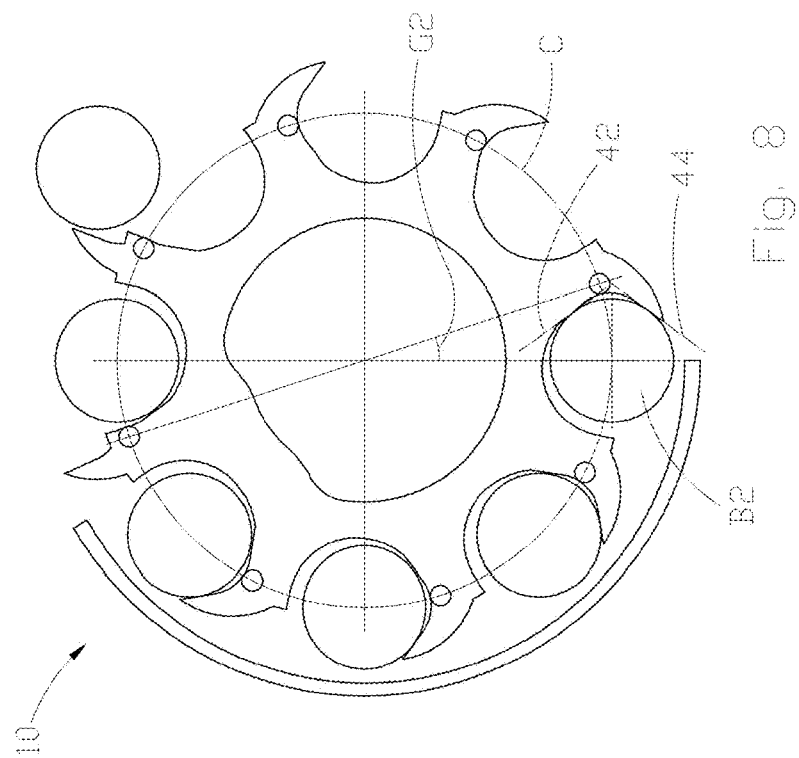
FIG. 9 is a synthetic top view of the apparatus of FIG. 1, apparatus used for moving bottles with a second diameter.

Below and as shown in FIGS. 8 and 9, it is shown, with illustrative scope, how the apparatus according to the invention can be used for operations on two types of bottles B1 and B2, different for their diameter.

The head of an operating machine, not shown by the figures, is placed in correspondence of the circular line, indicated with C, which passes through the center of both the bottles B1 and the bottles B2, and thus through the center of the neck and of the opening hole of the bottles B1 and B2.

Both the shape of the side face of the scoop 16, having a curved profile, as long as the side edge 15, which is curved as well, of the portion of end 14, permit to center the bottle, regardless of its diameter.

Figure 4:
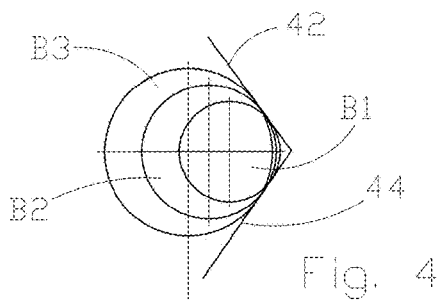
FIG. 4 is a synthetic architectural top view which shows the lines tangent to the perimeter of three ideally overlapped containers, having different diameters, and handled by a handling mean of the apparatus of FIG. 1.

As shown in FIG. 4, three bottles B1, B2, B3 with different diameter are ideally received by a scoop 16 and by the portion of end 14.

Regardless of their diameters, the two contact points of the bottles with respectfully the edge 15 of the portion of end 14 and the side face of the scoop 16, correspond to the tangent points of two incidence straight lines 42, 44.

The geometrical centers of the bottles lay on the bisector of the angle defined by the two straight lines 42, 44, which are not coincided to each other on varying of the size of the container.

Therefore, the only adjustment to be performed on the apparatus in order to move bottles with different diameter is to bring the geometrical centers of bottles with different diameter on the same point so that the bottles can be worked by the head of the operating machine, which can be a bottling machine, a plugging machine or others.

In order to obtain a perfect overlapping of the geometrical centers, a small rotation of the star-shaped structure 12 is carried out, while the guide 34 stay fixed relative to the head of the operating machine, according to the diameter of the bottles to be worked.

In order to perform said rotation, it is acted on an engine automatically, not shown on the figures; said engine rotates the star-shaped structure 12 released from the rotation of the other elements of the machine, by an angle sufficient to center the neck of the container with the head of the operating machine and to bring itself in phase with the operating machine itself.

It is however possible to carry out said operation even manually.

Figure 5:
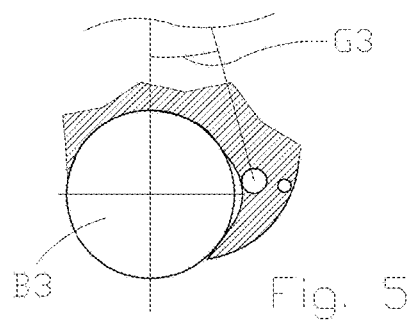
FIGS. 5, 6, 7 are synthetic architectural top views which shows the three different positions of a handling mean of the apparatus of FIG. 1, according to the different diameter of the container to be moved.
Figure 6:
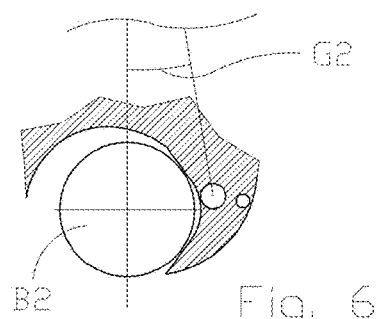
Figure 7:
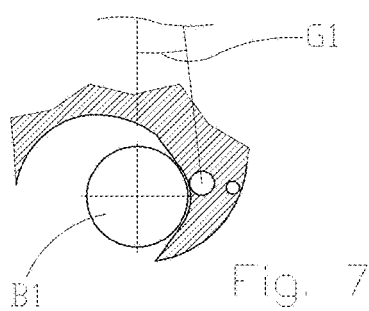

The proof of said rotation is the fact that, as shown in FIGS. 5, 6, 7, the angles G1, G2, G3, having as vertex the center of the circumference defined by the trajectory followed by the geometrical centers of the bottles and comprised between the straight line passing through the shaft 18 and the geometrical centers of the bottles B1, B2, B3, are different from each other.

Further variants are possible to be considered within the scope of protection; for example, the number of portions of end comprised in the rotating star-shaped structure, and consequently the number of scoops, can be different from eight.

Besides, the movement of the scoops according to the zone in which the bottle is, can be performed as well by a different lever system or by a system different from a cam mechanism.

The invention claimed is:

1. Apparatus (10) for the movement of bottles in bottling plants, comprising a frame and a star-shaped structure (12) adapted to rotate on a vertical axis relative to the frame through first moving means and comprising at least a portion of an end (14) with a side edge (15), said side edge (15) being adapted to abut on a first bottle so as to move it, wherein a scoop (16) is pivoted on the at least a portion of said end (14) and has a side face placed adjacent to the side edge (15) and adapted to abut on the first bottle, so that the side face and the side edge (15) create a continuous supporting profile for the first bottle, said scoop (16) being coupled to a moving mechanism adapted to make the scoop (16) rotate with respect to the at least a portion of said end (14), so as to vary the angle comprised between the side face and the side edge (15); wherein the moving mechanism comprises:
   a guide (34) fixed to the frame,
   a first lever (22) coupled to the scoop (16) in correspondence of a first end and comprising a roller (32) on a second end, opposite to the first end, the roller (32) being adapted to slide on said guide (34);
wherein the first end of the first lever (22) is connected rotatably to the scoop (16) and the moving mechanism comprises a second lever (28) comprising a first end connected rotatably to the star-shaped structure (12) and a second end, opposite to the first end, connected rotatably to the second end of the first lever (22).

2. Apparatus (10) according to claim 1, wherein the guide (34) has, in a first portion, a regular, circular development coinciding with the center of rotation of the rotating structure and, in a second portion, a curvilinear development so as to make the position of the scoop (16) vary relative to the respective portion of said end (14) according to the position of the roller (32) on the guide (34).

3. Apparatus (10) according to claim 2, wherein the guide (34) is rotatable relative to the frame through second moving means, so as to adjust the different positions of the scoop (16) relative to the respective portion of said end (14) according to the position of the guide (34) with respect to the frame.

4. Apparatus (10) according to claim 1, wherein the position of the star-shaped structure (12) relative to the frame is adjustable through second moving means, so as to set up the apparatus according to the diameter of the bottles to be moved.

5. Apparatus (10) according to claim 1, wherein the side edge (15) of the portion of said end (14) and the side face of the scoop (16) fixed to the portion of said end (14) show together, substantially, a V-shape self-centering of the container.

6. Apparatus (10) according to claim 1, wherein the side edge (15) of the portion of said end (14) is curved and concave.

7. Apparatus (10) according to claim 1, wherein the side face of the scoop (16) has a curved, concave development.

8. Apparatus (10) according to claim 1, wherein the scoop (16) is coupled with a shaft (18) to a top supporting structure (20) which is integral to the rotating star-shaped structure.

9. Apparatus (10) according to claim 1, wherein a base (38) is comprised for the support of bottles.

10. Apparatus (10) according to claim 1, wherein a wall (40) is comprised which delimits at least a portion of the path followed by the bottles.

11. Apparatus (10) according to claim 2, wherein the position of the star-shaped structure (12) relative to the frame is adjustable through second moving means, so as to set up the apparatus according to the diameter of the bottles to be moved.

12. Apparatus (10) according to claim 3, wherein the position of the star-shaped structure (12) relative to the frame is adjustable through second moving means, so as to set up the apparatus according to the diameter of the bottles to be moved.

13. Apparatus (10) according to claim 2, wherein the side edge (15) of the portion of said end (14) and the side face of the scoop (16) fixed to the portion of said end (14) show together, substantially, a V-shape self-centering of the container.

14. Apparatus (10) according to claim 3, wherein the side edge (15) of the portion of said end (14) and the side face of the scoop (16) fixed to the portion of said end (14) show together, substantially, a V-shape self-centering of the container.

15. Apparatus (10) according to claim 4, wherein the side edge (15) of the portion of said end (14) and the side face of the scoop (16) fixed to the portion of said end (14) show together, substantially, a V-shape self-centering of the container.

16. Apparatus (10) according to claim 2, wherein the side edge (15) of the portion of said end (14) is curved and concave.

17. Apparatus (10) according to claim 3, wherein the side edge (15) of the portion of said end (14) is curved and concave.

18. Apparatus (10) according to claim 4, wherein the side edge (15) of the portion of said end (14) is curved and concave.

19. Apparatus (10) according to claim 5, wherein the side edge (15) of the portion of said end (14) is curved and concave.

20. Apparatus (10) according to claim 2, wherein the side face of the scoop (16) has a curved, concave development.

* * * * *